United States Patent
Ookubo et al.

(10) Patent No.: US 10,427,233 B2
(45) Date of Patent: Oct. 1, 2019

(54) WIRE ELECTRICAL DISCHARGE MACHINE AND WIRE ELECTRICAL DISCHARGE MACHINING METHOD

(71) Applicant: FANUC CORPORATION, Yamanashi (JP)

(72) Inventors: Kousuke Ookubo, Yamanashi (JP); Shouta Irie, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 64 days.

(21) Appl. No.: 15/659,978

(22) Filed: Jul. 26, 2017

(65) Prior Publication Data
US 2018/0029153 A1    Feb. 1, 2018

(30) Foreign Application Priority Data
Jul. 27, 2016  (JP) .................. 2016-147139

(51) Int. Cl.
*B23H 7/18*     (2006.01)
*B23H 7/06*     (2006.01)
(Continued)

(52) U.S. Cl.
CPC ............... *B23H 7/18* (2013.01); *B23H 7/04* (2013.01); *B23H 7/065* (2013.01); *B23H 7/101* (2013.01);
(Continued)

(58) Field of Classification Search
CPC ... B23H 7/18; B23H 7/20; B23H 7/04; B23H 7/05; B23H 7/101; B23H 7/065; B23H 2500/20; G05B 19/401; G05B 2219/45043
See application file for complete search history.

(56) References Cited

U.S. PATENT DOCUMENTS

| | | | | |
|---|---|---|---|---|
| 6,836,741 | B2* | 12/2004 | Liang | B23H 7/065 |
| | | | | 219/69.17 |
| 7,211,762 | B2* | 5/2007 | Kinoshita | B23H 7/04 |
| | | | | 219/69.12 |

(Continued)

FOREIGN PATENT DOCUMENTS

| | | |
|---|---|---|
| JP | 2-139129 A | 5/1990 |
| JP | 7-9262 A | 1/1995 |

(Continued)

OTHER PUBLICATIONS

Extended European Search Report in EP Application No. 17001277.7, dated Jan. 22, 2018, 10 pp.

Primary Examiner — Geoffrey S Evans
(74) Attorney, Agent, or Firm — Hauptman Ham, LLP

(57) ABSTRACT

A wire electrical discharge machine includes: a mounting table having a placement plane on which a workpiece can be placed; a first guide portion and a second guide portion for stretching a wire electrode therebetween. The first guide portion is integrally equipped with a probe. The relative position in the placement plane between the probe detecting its abutment with the workpiece and the first guide portion before moving the relative position between the first guide portion and the second guide portion is stored as an offset. This offset is corrected based on the tilt information indicating the tilt state of the workpiece relative to the placement plane. Thus, it is possible to obtain the corrected offset in accordance with the tilt state of the workpiece after changing the relative position between the first guide portion and the second guide portion.

14 Claims, 13 Drawing Sheets

(51) Int. Cl.
  *B23H 7/20*   (2006.01)
  *B23H 7/04*   (2006.01)
  *B23H 7/10*   (2006.01)
  *G05B 19/401*   (2006.01)
  *B23H 7/02*   (2006.01)

(52) U.S. Cl.
  CPC ............... *B23H 7/105* (2013.01); *B23H 7/20* (2013.01); *G05B 19/401* (2013.01); *B23H 7/02* (2013.01); *B23H 2500/20* (2013.01); *G05B 2219/45043* (2013.01); *G05B 2219/45221* (2013.01); *G05B 2219/50331* (2013.01)

(56) References Cited

U.S. PATENT DOCUMENTS

| | | |
|---|---|---|
| 2006/0102596 A1 | 5/2006 | Kinoshita et al. |
| 2013/0180866 A1 | 7/2013 | Baumeler |
| 2014/0236341 A1* | 8/2014 | Nishikawa ............ G05B 19/182 700/162 |
| 2018/0021870 A1* | 1/2018 | Murakawa .............. B23H 1/024 219/69.12 |
| 2018/0369943 A1* | 12/2018 | Masuda ................. B23H 7/065 |

FOREIGN PATENT DOCUMENTS

| | | |
|---|---|---|
| JP | 11-207528 A | 8/1999 |
| JP | 2006-159396 A | 6/2006 |
| JP | 2008-044033 A | 2/2008 |
| JP | 2012-179705 A | 9/2012 |
| JP | 2013-215830 | 10/2013 |
| JP | 2014-159055 A | 9/2014 |
| JP | 2015-036181 A * | 2/2015 |

* cited by examiner

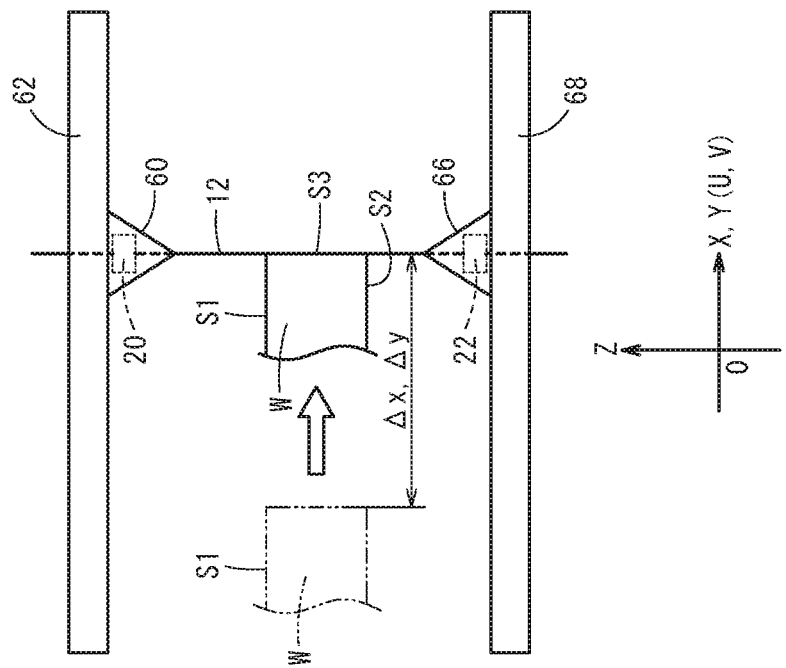
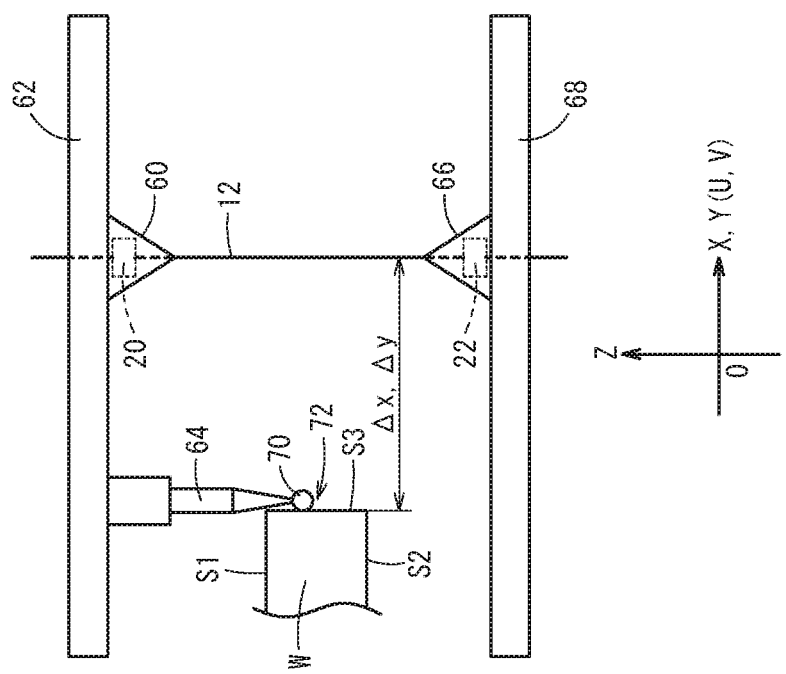

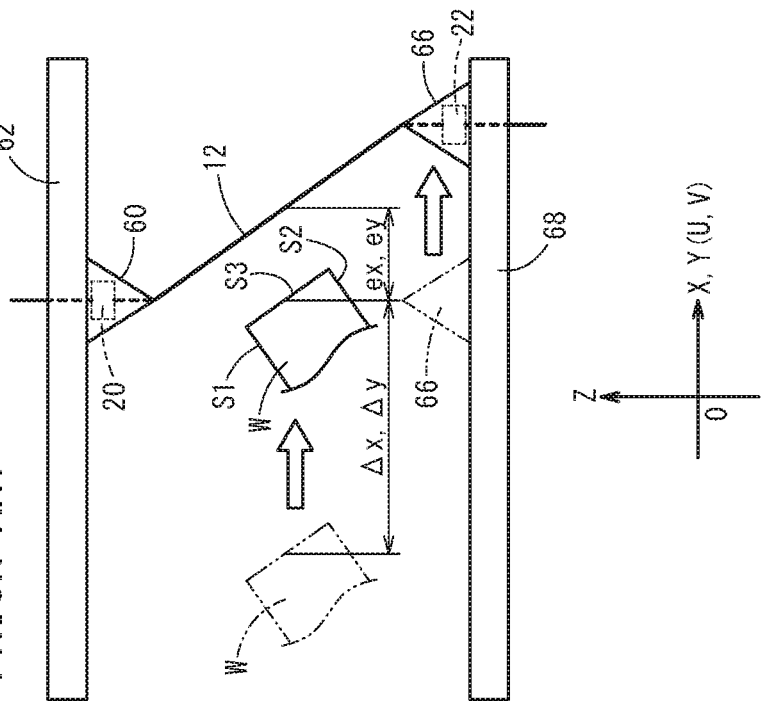
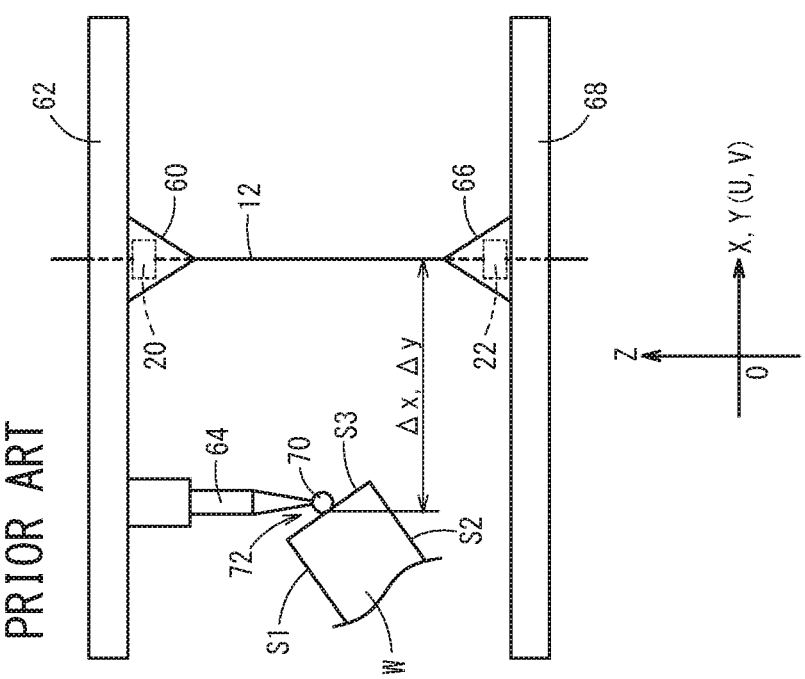

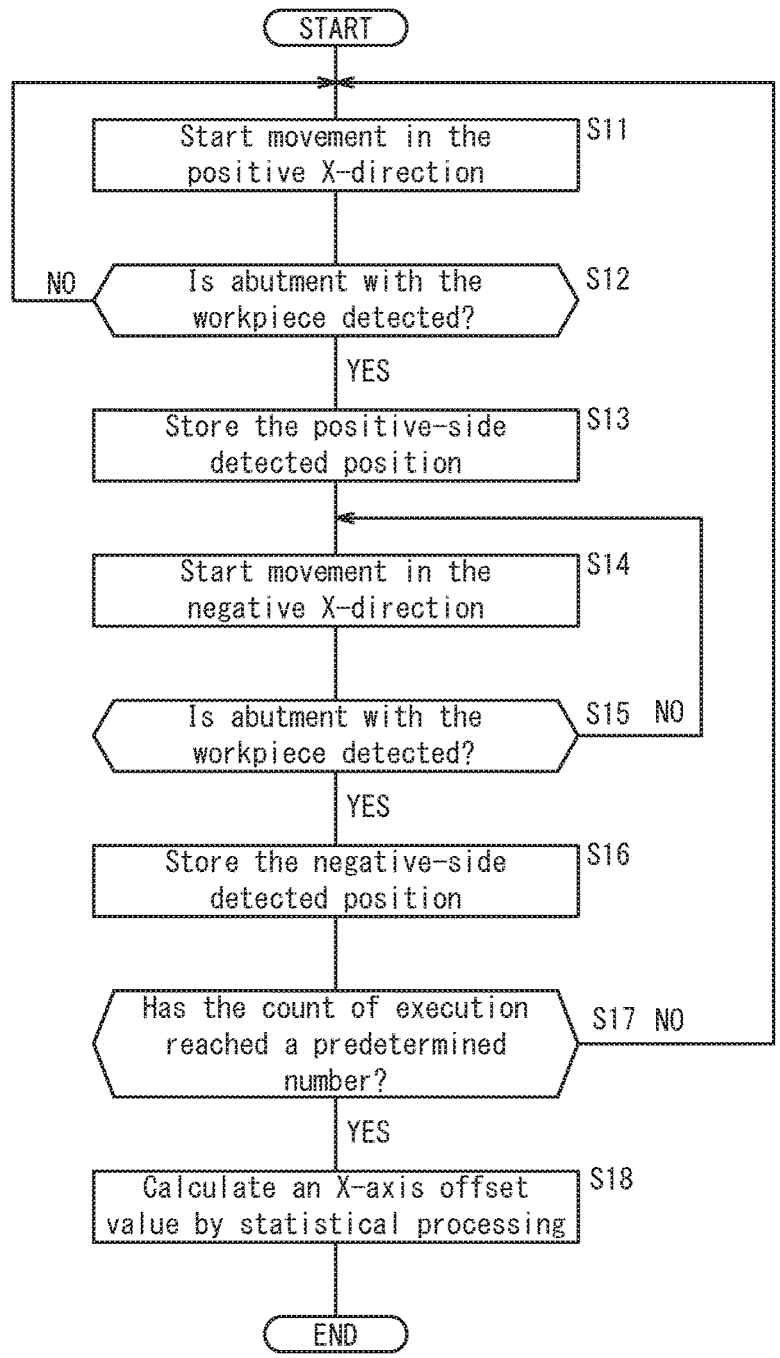

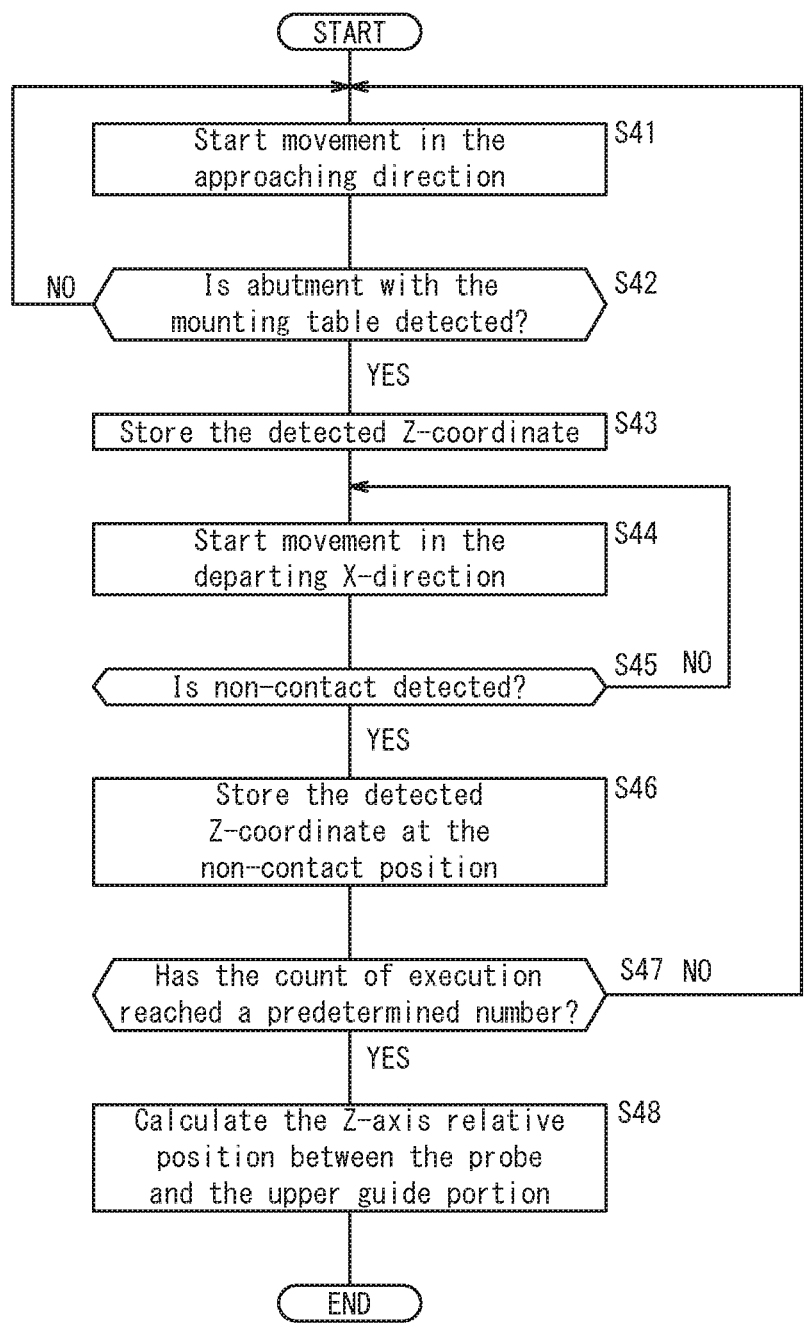

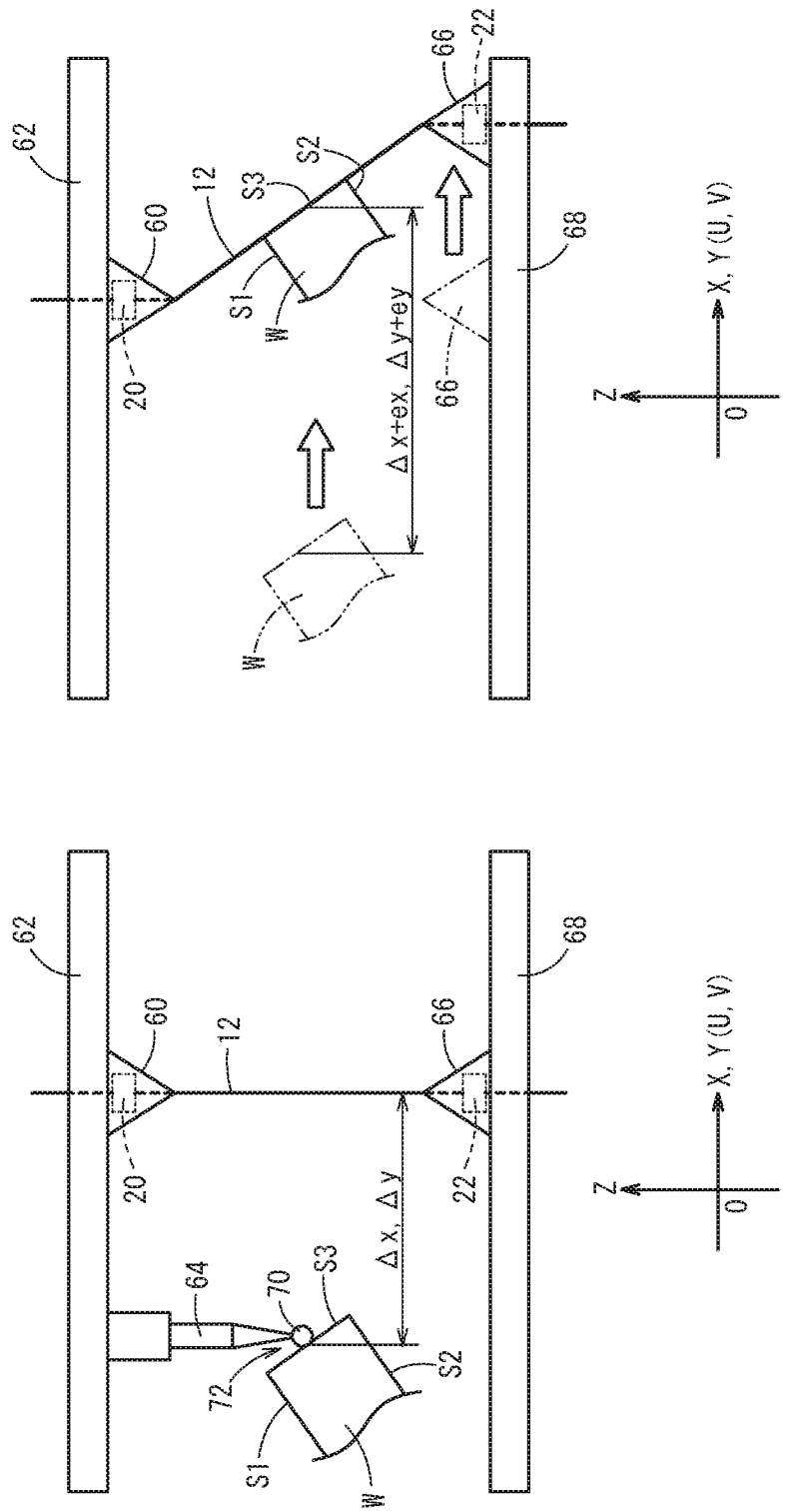

WIRE ELECTRICAL DISCHARGE MACHINE AND WIRE ELECTRICAL DISCHARGE MACHINING METHOD

CROSS-REFERENCE TO RELATED APPLICATION

This application is based upon and claims the benefit of priority from Japanese Patent Application No. 2016-147139 filed on Jul. 27, 2016, the contents of which are incorporated herein by reference.

BACKGROUND OF THE INVENTION

Field of the Invention

The present invention relates to a wire electrical discharge machine and wire electrical discharge machining method for performing electrical discharge machining on a workpiece by generating electric discharge between a wire electrode and the workpiece.

Description of the Related Art

Conventionally, there have been developed wire electrical discharge machines that perform electrical discharge machining on a workpiece by generating electric discharge between a wire electrode and the workpiece. In this field, there has been proposed a machining technique that compensates for errors when a tilt error of the workpiece relative to the mount surface has occurred due to adhesion of sludge or the like.

Japanese Laid-Open Patent Publication No. 2006-159396 has disclosed an apparatus and method having a so-called "horizontal correction function" whereby the relative position of a pair of wire guides is adjusted so as to stretch the wire electrode parallel to the inclination of the workpiece surface, regarding the adjusted positions as being vertical. Use of this horizontal correction function makes it possible to reduce angular errors of the machining target surface and distortion errors of the machining target shape.

SUMMARY OF THE INVENTION

Meanwhile, a "probe measurement function" of measuring the position where a probe, which can move integrally with one of the wire guides, abuts a workpiece and calculating the position or the amount of shift for relatively moving the wire electrode, has also been conventionally known. Specifically, by adding a predetermined offset (obtained from the relative position between the wire guide in question and the probe) to the contact position of the probe, the position of the paired wire guides to be set can be determined.

However, when the probe measurement function is used together with the horizontal correction function set in the "ON" state, in some cases a desired measurement result cannot be obtained depending on the tilt of the wire electrode. That is, there is sufficient room for improvement in view of managing both maintenance of processing accuracy and automatic detection of the workpiece position.

The present invention has been devised to solve the above problems, it is therefore an object of the present invention to provide a wire electrical discharge machine and a wire electrical discharge machining method that can maintain processing accuracy and perform automatic detection of the workpiece position at the same time even when a workpiece is set with an inclination error with respect to the mount surface.

A wire electrical discharge machine according to the first invention includes: a mounting table having a placement plane on which a workpiece can be placed; a first guide portion and second guide portion configured to support and stretch a wire electrode therebetween, wherein the workpiece is subjected to electrical discharge machining under a condition where the relative position between the first guide portion and the second guide portion is adjusted so as to align the inclination of the wire electrode with the tilt of the workpiece with respect to the placement plane; a probe configured to be movable integrally with the first guide portion and detect abutment against the workpiece placed on the mounting table; when a three-axis coordinate system is defined by a plane coinciding with the placement plane and a normal direction of the placement plane, an offset storage configured to store as an offset the relative position in the plane between the first guide portion and the probe that is in a detected position of abutment against the workpiece before changing the relative position between the first guide portion and the second guide portion; a tilt information acquisition unit configured to acquire tilt information representing a tilt state of the workpiece with respect to the placement plane; and, an offset correction unit configured to correct the offset stored in the offset storage based on the tilt information acquired by the tilt information acquisition unit and thereby obtain an offset corresponding to the tilt state of the workpiece after changing the relative position between the first guide portion and the second guide portion.

In this way, by correcting the previously stored offset based on the tilt information indicating the tilt state of the workpiece, it is possible to calculate offset values suitable for the tilt state of the workpiece W from a common offset. As a result, even when an inclination error of the workpiece with respect to the placement plane occurs, it is possible to maintain the processing accuracy and perform automatic detection of the workpiece position at the same time.

In the first invention, the wire electrical discharge machine may further include a relative position acquisition unit for obtaining a relative position in the normal direction between the probe and the first guide portion and may be constructed such that the offset correction unit corrects the offset based on a tilt angle of the workpiece as the tilt information and the relative position in the normal direction acquired by the relative position acquisition unit.

In the first invention, the wire electrical discharge machine may further include a relative position acquisition unit configured to obtain at least two relative positions in the normal direction between the probe, the first guide portion, and the second guide portion, and may be constructed such that the offset correction unit corrects the offset based on the amount of movement of the position of the second guide portion as the tilt information and the, at least, two relative positions, acquired by the relative position acquisition unit.

In the first invention, the wire electrical discharge machine may be constructed such that the relative position acquisition unit acquires the relative position by correcting the position in the normal direction in accordance with the size of the sensor part provided for the probe.

In the first invention, the wire electrical discharge machine may be constructed such that the offset correction unit corrects the offset in accordance with the size of the sensor part provided for the probe.

A wire electrical discharge machining method according to the second invention is a method for use in a wire electrical discharge machine that includes: a mounting table having a placement plane on which a workpiece can be placed; a first guide portion and second guide portion that support and stretch a wire electrode therebetween, wherein the workpiece is subjected to electrical discharge machining under a condition where the relative position between the first guide portion and the second guide portion is adjusted so as to align the inclination of the wire electrode with the tilt of the workpiece relative to the placement plane; and, a probe configured to be movable integrally with the first guide portion and detect abutment against the workpiece placed on the mounting table, and includes: when a three-axis coordinate system is defined by an XY-plane coinciding with the placement plane and a normal direction of the placement plane, a storing step of storing as an offset the relative position in the XY-plane between the first guide portion and the probe that is in a detected position of abutment against the workpiece before changing the relative position between the first guide portion and the second guide portion; a tilt information acquiring step of acquiring tilt information representing a tilt state of the workpiece relative to the placement plane; and a correcting step of correcting the stored offset based on the acquired tilt information and thereby obtaining an offset corresponding to the tilt state of the workpiece after changing the relative position between the first guide portion and the second guide portion.

In the second invention, the wire electrical discharge machining method may further include: a relative position acquiring step of obtaining a relative position in the normal direction between the probe and the first guide portion, and in the correcting step, the offset may be corrected based on a tilt angle of the workpiece as the tilt information and the acquired relative position in the normal direction.

In the second invention, the wire electrical discharge machining method may further include: a relative position acquiring step of obtaining at least two relative positions in the normal direction between the probe, the first guide portion, and the second guide portion, and in the offset correcting step, the offset may be corrected based on the amount of movement of the position of the second guide portion as the tilt information and the, at least, two acquired relative positions.

In the second invention, in the relative position acquiring step, the relative position may be acquired by correcting the position in the normal direction, in accordance with the size of the sensor part provided for the probe.

In the second invention, in the offset correcting step, the offset may be corrected in accordance with the size of the sensor part provided for the probe.

According to the wire electrical discharge machine and wire electrical discharge machining method of the present invention, even when an inclination error of the workpiece with respect to the placement plane occurs, it is possible to maintain the processing accuracy and perform automatic detection of the workpiece position at the same time.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2A and 2B are schematic views for illustrating a probe measurement function of the wire electrical discharge machine shown in FIG. 1;

FIGS. 3A and 3B are schematic views for illustrating a horizontal correction function of the wire electrical discharge machine shown in FIG. 1;

FIG. 6 is a flow chart for detailing a process (Step S1 in FIG. 4) of measuring an offset value;

FIG. 9 is a flow chart for detailing a process (Step S4 in FIG. 4) of acquiring the relative position as to Z-axis;

DESCRIPTION OF THE PREFERRED EMBODIMENTS

Referring now to the accompanying drawings, the wire electrical discharge machines according to the present invention will be explained in detail by describing preferred embodiments in relation with wire electrical discharge machining methods.

[Overall Structure of Wire Electrical Discharge Machine 10]

Figure 1:
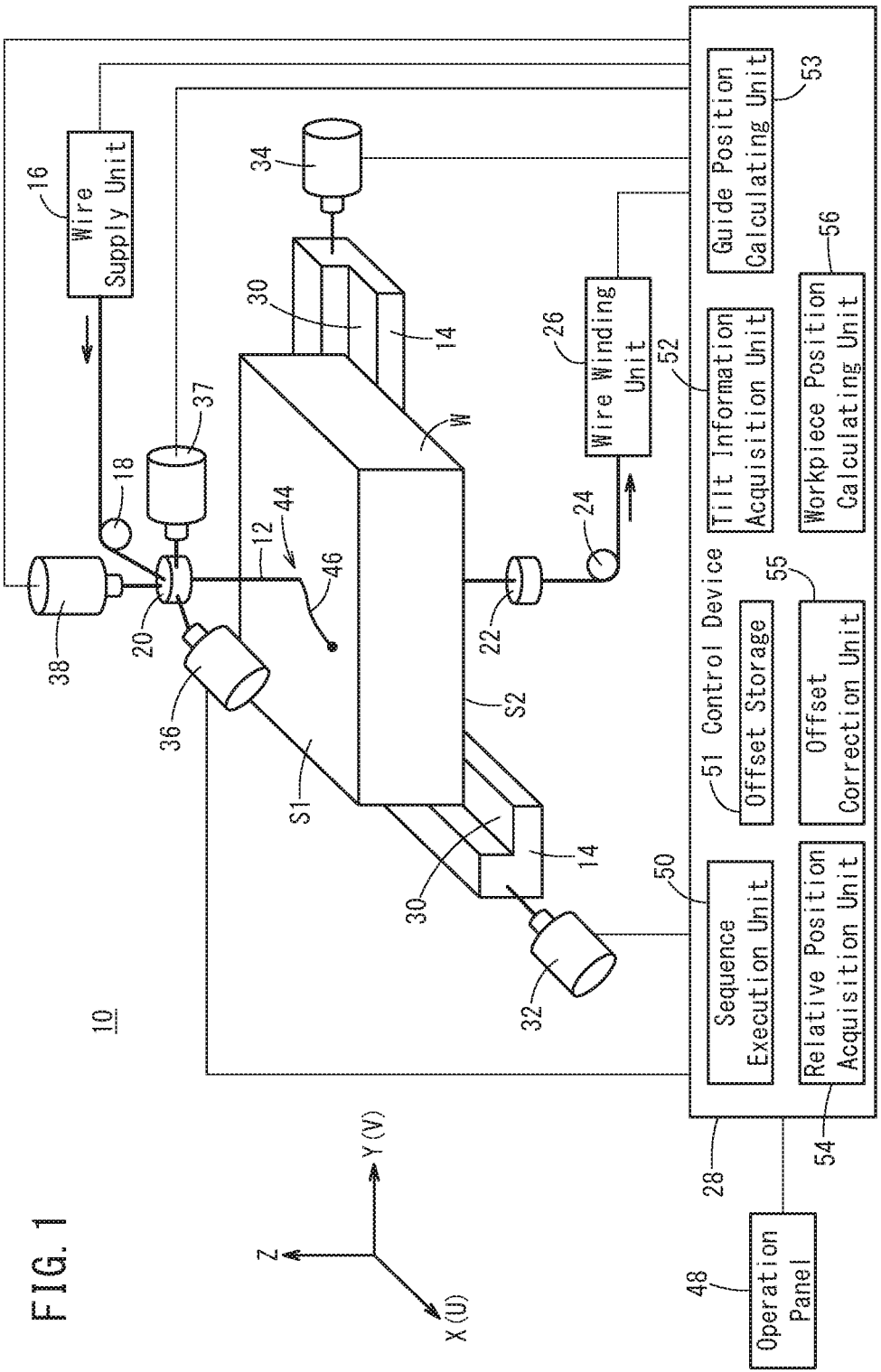
FIG. 1 is an overall diagram showing a configuration of a wire electrical discharge machine according to one embodiment of the present invention.

FIG. 1 is a schematic configuration diagram of a wire electrical discharge machine 10 according to one embodiment of the present invention. The wire electrical discharge machine 10 is a machine tool which operates in accordance with a predetermined machining program and performs electrical discharge machining on a workpiece W by electric discharge generated between a wire electrode 12 and the workpiece W. The wire electrode 12 is formed of, for example, metal material such as tungsten-based, copper alloy-based and brass-based material. On the other hand, the material of the workpiece W is, for example, iron-based material or superhard material (tungsten carbide).

The wire electrical discharge machine 10 includes: a mounting table 14 on which a workpiece W can be placed; a wire supply unit 16 that supplies the wire electrode 12; die guides 20 and 22 for guiding downwards the wire electrode 12 supplied through a guide roller 18 while stretching the electrode; a wire winding unit 26 that winds the wire electrode 12 via the die guide 22 and the guide roller 24; and a control device 28 that controls each unit.

The mounting table 14 has a placement plane 30 of high-precision flatness. When a rectangular parallelepiped workpiece W is mounted, the workpiece W is fixed on the mounting table 14 so that the undersurface, designated at S2, which is parallel to the top surface, designated at S1, contacts the placement plane 30. The mounting table 14 is disposed in a work tank (not shown) capable of storing dielectric working fluid used for electrical discharge machining.

The mounting table 14 is provided with an X-axis driving mechanism 32 and a Y-axis driving mechanism 34, which are drive sources such as servo motors. The control device 28 is capable of moving the mounting table 14 in the X-axis direction by supplying drive signals to the X-axis driving mechanism 32. The control device 28 can also move the mounting table 14 in the Y-axis direction by supplying drive signals to the Y-axis driving mechanism 34. It should be noted that instead of the mounting table 14, the die guide 22 may be moved in the XY plane by using the X-axis driving mechanism 32 and the Y-axis driving mechanism 34.

The die guide 20 is provided with a U-axis driving mechanism 36, a V-axis driving mechanism 37, and a Z-axis driving mechanism 38, which are drive sources such as servo motors. The control device 28 can move the die guide 20 in the U-axis direction by supplying drive signals to the U-axis driving mechanism 36. The control device 28 is also capable of moving the die guide 20 in the V-axis direction by supplying drive signals to the V-axis driving mechanism 37. Further, the control device 28 can move the die guide 20 in the Z-axis direction by supplying drive signals to the Z-axis driving mechanism 38.

Here, the three-axis coordinate system formed by X-, Y- and Z-axes is defined by the plane (XY plane) corresponding to the placement plane 30 and the direction (Z-axis direction) normal to the placement plane 30, and is a machine coordinate system unique to the wire electrical discharge machine 10. The two-axis coordinate system formed by the U- and V-axes is parallel to the XY plane and is a machine coordinate system prepared for angle adjustment during taper machining. A horizontal correction function described below is performed by moving the die guide 20 independently of the die guide 22. The following description will be made on the assumption that the X-axis and the U-axis (Y-axis and V-axis) coincide with each other. However, a coordinate system in which these axes do not coincide may be defined.

That is, the wire electrical discharge machine 10 is configured to use, at least, one of the X-axis driving mechanism 32, the Y-axis driving mechanism 34, the U-axis driving mechanism 36, and the V-axis driving mechanism 37 to move the workpiece W relative to the wire electrode 12. By relatively moving the workpiece W to the wire electrode 12 with the wire electrode 12 linearly penetrating the workpiece W through the machining target portion 44, a machined groove 46 is formed along a desired machining path.

The control device 28 includes, for example, a CPU (Central Processing Unit), CNC (Computerized Numerical Control), an input/output device such as an operation panel 48, a memory, and a power supply. The control device 28 performs control of the above-mentioned driving mechanisms (each of X-, Y-, Z-, U- and V-axes), control of the power supply for electric discharge, feed control of the wire electrode 12, and display control of the operation panel 48. The control device 28 functions as a sequence execution unit 50, an offset storage 51, a tilt information acquisition unit 52, a guide position calculating unit 53, a relative position acquisition unit 54, an offset correction unit 55, and a workpiece position calculating unit 56.

[Special Function by Wire Electrical Discharge Machine 10]

Next, a special function by the wire electrical discharge machine 10 will be described with reference to FIGS. 2A to 3B. FIGS. 2A and 2B are schematic diagrams for explaining a probe measurement function of the wire electrical discharge machine 10 shown in FIG. 1. FIGS. 3A and 3B are schematic diagrams for explaining a horizontal correction function of the wire electrical discharge machine 10 shown in FIG. 1.

<Probe Measurement Function>

As shown in FIG. 2A, an upper guide portion 60 (first guide portion) including the die guide 20 is supported by an upper guide block 62. Fixed to the upper guide block 62 at a position distant from the upper guide portion 60 is a probe 64 extending in the Z-axis direction (toward the die guide 22 side). The U-axis driving mechanism 36, the V-axis driving mechanism 37, and the Z-axis driving mechanism 38 (FIG. 1) are each connected to the upper guide block 62. This enables the upper guide portion 60 to move integrally with the probe 64 in the three axial directions (U-axis direction, V-axis direction and Z-axis direction).

On the other hand, a lower guide portion 66 (second guide portion) including the die guide 22 is supported by a lower guide block 68. By moving the mounting table 14 in the XY plane by means of the X-axis driving mechanism 32 and the Y-axis driving mechanism 34, the lower guide portion 66 can move in the two axial directions (X-axis direction and Y-axis direction) relative to the workpiece W fixed on the mounting table 14. Here, it should be noted that the lower guide portion 66 may be moved in the two axial directions (X-axis direction and Y-axis direction) by moving the die guide 22, instead of the mounting table 14, in the XY plane by using the X-axis driving mechanism 32 and the Y-axis driving mechanism 34.

That is, the upper guide portion 60 and the lower guide portion 66 can support and stretch the wire electrode 12 and make the wire electrode 12 tilt with respect to the Z-axis direction by changing the relative position of the upper and lower guide portions. In this figure, the wire electrode 12 is extended and stretched in the Z-axis direction.

Meanwhile, a spherical sensor part 70 is arranged at the tip of the probe 64. The control device 28 can detect XYZ-coordinates (the current position of the upper guide portion 60) when the sensor part 70 of the probe 64 abuts the end face S3 of the workpiece W.

Here, the relative position as to the X-axis and Y-axis between the upper guide portion 60 and the probe 64 has been known, and the deviation ($\Delta x$) on the X-axis and the deviation ($\Delta y$) on the Y-axis have been stored as "offset values". In this case, the X-axis offset value ($\Delta x$) is added to the detected X-coordinate and the Y-axis offset value ($\Delta y$) is added to the detected Y-coordinate and further the influence of the size of the sensor part 70 is taken into consideration, whereby the UV-coordinates of the upper guide portion 60 (or the XY-coordinates of the lower guide portion 66) corresponding to the contact point, designated at 72, is calculated. When the radius R of the sensor part 70 is sufficiently small, the influence of the size of the sensor part 70 may be ignored.

As shown in FIG. 2B, by moving the upper guide portion 60 and the lower guide portion 66 to the calculated position simultaneously, it is possible to set the wire electrode 12 along the end face S3 of the workpiece W. Hereinafter, the function of measuring the position of the workpiece W with the probe 64 is referred to as "probe measurement function".

<Problems Resulting from to Horizontal Correction Function>

Changing the relative position between the upper guide portion 60 and the lower guide portion 66 and tilting the wire electrode 12 in conformity with the tilted state of the workpiece W make it possible to machine the workpiece W with errors (angular error of the machining target surface and distortion error of the machining target shape) reduced. This technique is known as "horizontal correction function". When the "probe measurement function" and the "horizontal correction function" are used in combination in the wire electrical discharge machine 10, the following problems will occur.

As shown in FIG. 3A, it is assumed that the workpiece W is inclined with respect to the placement plane 30 (XY plane). Here, the contact point 72 of the workpiece W is assumed to be detected using the above-described method. For description convenience, it is assumed that the same offset values ($\Delta x$, $\Delta y$) as in the case of FIG. 2A are obtained.

As shown in FIG. 3B, it is assumed that as a result of setting the horizontal correction function "ON", the position of the lower guide portion 66 is moved in the XY plane with the position of the upper guide portion 60 fixed. At this time, due to the inclination of the wire electrode 12, the distance from the contact point 72 to the wire electrode 12 varies. Here, the distance becomes longer by the offset error (ex, ey). That is, direct use of the offset values ($\Delta x$, $\Delta y$) obtained with the horizontal correction function set "OFF" causes a problem that the position of the workpiece W cannot be correctly measured.

To deal with this problem, even when there is a tilt error of the workpiece W with respect to the placement plane 30, it is possible to realize a function (hereinafter referred to as "offset correction function") capable of maintaining the machining accuracy (horizontal correction function) and automatic detection of the work position (probe measurement function). This offset correction function will be proposed next.

[Operation of Wire Electrical Discharge Machine 10]

Hereinafter, the operation of the wire electrical discharge machine 10 performing the offset correction function will be described in detail with reference mainly to the flowchart in FIG. 4.

<Offset Measuring Process (Step S1)>

Figure 4:
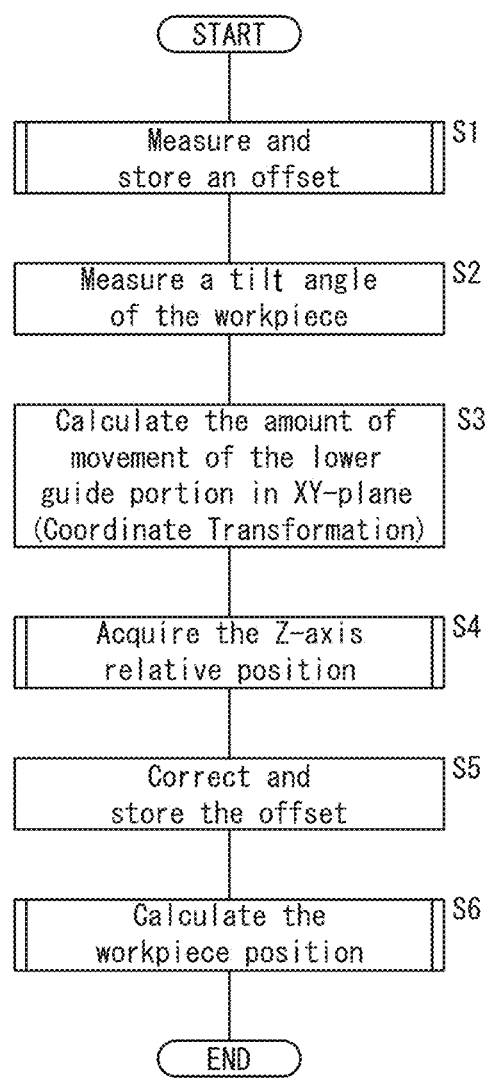
FIG. 4 is a flow chart for explaining the operation of a wire electrical discharge machine that performs an offset correction function.

At Step S1 in FIG. 4, the control device 28 (sequence execution unit 50) performs a series of sequence control for measuring the offset values for each part. Prior to this measurement, the workpiece W is placed on the mounting table 14, and a through hole 74 is formed in the workpiece W from the upper face S1 side.

Figure 5A:
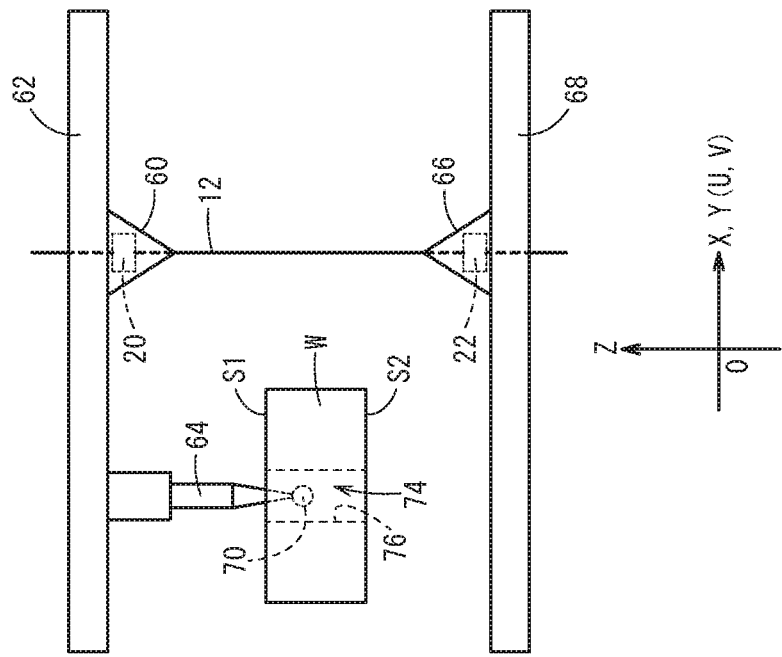
FIG. 5A is a view showing a state where a wire electrode is passed through a through hole of a workpiece without being brought into contact with the workpiece.

FIG. 5A is a view showing a state in which the wire electrode 12 is inserted through the through hole 74 without being brought into contact with the workpiece W. Here, the wire electrode 12 is stretched and extended in the Z-axis direction. The controller 28, while moving the wire electrode 12 in the XY plane with voltage applied, senses a change in voltage at the moment when the wire electrode 12 abuts an inner wall 76 of the through hole 74 to detect the XY-coordinates when the wire electrode abuts the inner wall 76.

Figure 5B:
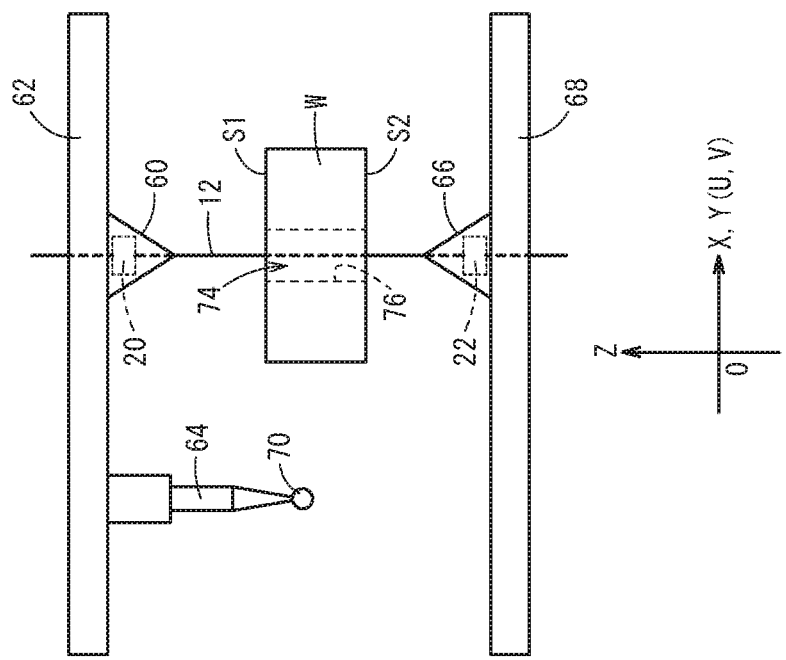
FIG. 5B is a view showing a state where a probe is inserted into a through hole of a workpiece without being brought into contact with the workpiece.

FIG. 5B is a view showing a state in which the probe 64 is inserted into the through hole 74 without being brought into contact with the workpiece W. The control device 28 moves the probe 64 in the XY plane and detects the XY-coordinates when the sensor part 70 is in contact with the inner wall 76.

FIG. 6 is a detailed flowchart relating to an offset value measuring process (Step S1 in FIG. 4). In the state shown in FIG. 5A, the sequence execution unit 50 starts moving the upper guide block 62 and the lower guide block 68 in the positive X-direction (Step S11) and determines whether abutment with the workpiece W is detected (Step S12). If not yet detected (Step S12: NO), the control returns to Step S11 and the movement of the wire electrode 12 is continued as it is.

When the sequence execution unit 50 detects the abutment with the workpiece W (Step S12: YES), the sequence execution unit 50 records the X-coordinate of the detected position of the lower guide portion 66 (hereinafter referred to as the positive side detected position) (Step S13).

Subsequently, the sequence execution unit 50 starts moving the upper guide block 62 and the lower guide block 68 in the negative X-direction (Step S14) and determines whether abutment with the workpiece W (Step S15) is detected. If not yet detected (Step S15: NO), the control returns to Step S14, and the movement of the wire electrode 12 is continued as it is.

When the sequence execution unit 50 detects the abutment with the workpiece W (Step S15: YES), the sequence execution unit 50 records the X-coordinate of the detected position of the lower guide portion 66 (hereinafter referred to as the negative side detected position) (Step S16).

Subsequently, the sequence execution unit 50 determines whether or not the count of execution has reached a predetermined number (for example, N times) (Step S17). If the count has not reached yet (Step S17: NO), the control returns to Step S11 so that Steps S11 to S17 are repeated. On the other hand, if the predetermined number has been reached (Step S17: YES), the control proceeds to the next step (S18).

At Step S18, the sequence execution unit 50 performs statistical processing on the 2N X-coordinates stored at Steps S13 and S16 to calculate the X-coordinate corresponding to the center of the through hole 74. For example, this may be calculated by dividing the sum of the N X-coordinates (of the positive side detection position) and the N X-coordinates (of the negative side detection position) by the sampling number (2N).

In this manner, the X-coordinate when the wire electrode 12 resides at the center of the through hole 74 is calculated. In the same manner as described above, the Y-coordinate when the wire electrode 12 resides at the center of the through hole 74 is calculated. Next, as shown in FIG. 5B, in a state where the probe 64 is inserted into the through hole 74, the X-coordinate and the Y-coordinate when the probe 64 is present at the center of the through hole 74 are similarly determined in a manner similar to the above procedures.

In this way, by calculating [1] the deviation between the two X-coordinates and [2] the deviation between the two Y-coordinates, the offset values when the horizontal correction function is assumed to be in "OFF" state are measured. Thereafter, the control device 28 stores the measurements in the offset storage 51 (Step S1).

<Tilt Angle Measurement Process (Step S2)>

At Step S2 in FIG. 4, the control device 28 (sequence execution unit 50) performs a series of sequence control for acquiring the tilt information on the workpiece W with respect to each part. For example, a known measurement method disclosed in Japanese Laid-Open Patent publication No. 2006-159396 can be used. With this method, a tilt information acquisition unit 52 acquires a tilt angle θ of the workpiece W measured by the series of sequence control. Information that indicates the inclined state of the workpiece W relative to the placement plane 30 can serve as the tilt information. For example, other than the tilt angle θ, the tilt information may be the relative movement between the upper guide portion 60 and the lower guide portion 66.

<Calculation Process of Movement (Step S3)>

At Step S3 in FIG. 4, the control device 28 (guide position calculating unit 53) calculates the amount of movement of the lower guide portion 66 using the tilt angle θ measured at Step S2. For example, use of the known 3D projective transformation disclosed in Japanese Laid-Open Patent Publication No. 2006-159396 enables calculation of the transformation result of the XYZ-coordinates (including the movement of the lower guide portion 66) in a state where the wire electrode 12 is inclined by the tilt angle θ.

Figure 7:
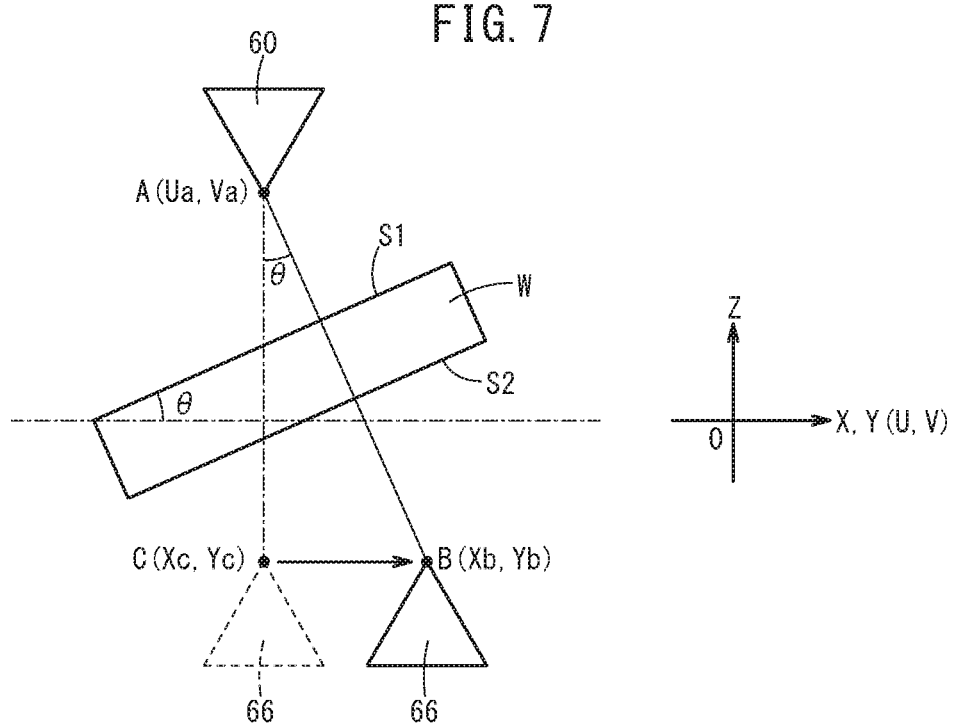
FIG. 7 is a schematic diagram for illustrating a method of calculating the amount of movement of a lower side guide portion.

FIG. 7 is a schematic diagram illustrating a method of calculating the amount of movement of the lower guide portion 66. For example, a point indicating the position of the upper guide portion 60 is defined as A (Ua, Va), a point indicating the position of the lower guide portion 66 after movement as B (Xb, Yb), and a point indicating the position of the lower guide portion 66 before movement as C (Xc, Yc). For example, when the workpiece W is tilted by the tilt angle θ with respect to the X-axis (U-axis), the XY-coordinates of the point B can be represented by equations (1) and (2), respectively, by simple geometrical considerations.

$$Xb = Xc + |AC| \tan \theta \quad (1)$$

$$Yb = Yc \quad (2)$$

Though description has been given on a case where only the lower guide portion 66 is moved in the XY plane, the way of changing the relative position between the upper guide portion 60 and the lower guide portion 66 is not limited to this. Specifically, a way of moving the upper guide portion 60 alone, or a way of moving both the upper guide portion 60 and the lower guide portion 66 may also be included.

<Acquiring Step of Z-Axis Relative Position (Step S4)>

At Step S4 in FIG. 4, the control device 28 (sequence execution unit 50) performs a series of sequence control for measuring the Z-axis relative position for each part. Here, the "Z-axis relative position" is a deviation of the Z-coordinate between any of two positions of [1] the upper guide portion 60, the [2] lower guide portion 66 and the [3] probe 64.

Calculation Example 1

Figure 8B:
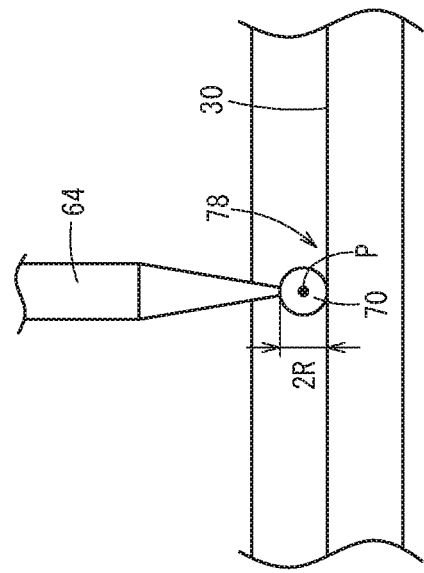
FIG. 8B is a partial enlarged view of an area around the point of abutment in FIG. 8A.
Figure 8A:
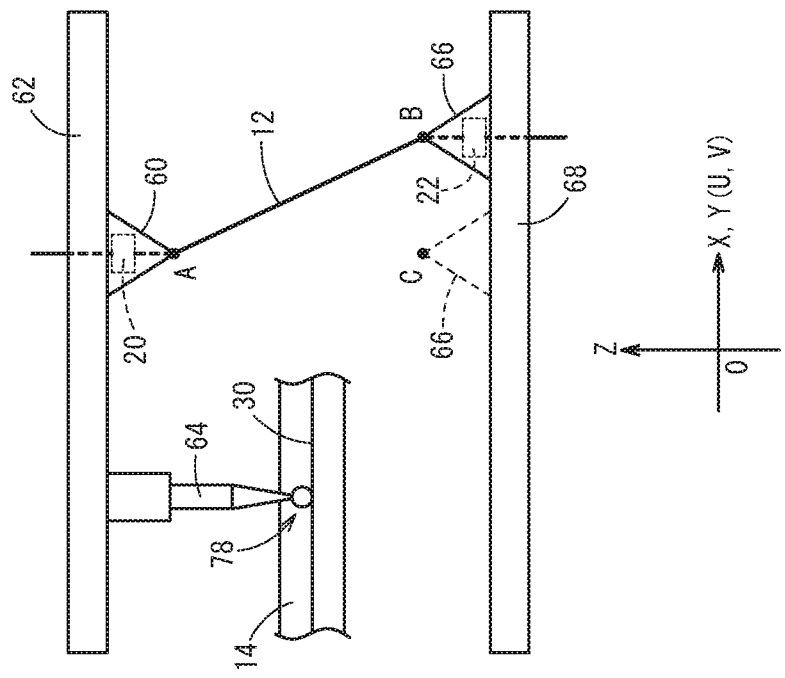
FIG. 8A is a view showing a state where a probe is put in abutment with a placement plane of a mounting table.

As a first calculation example, a method of acquiring a Z-axis relative position from the upper guide portion 60 to the probe 64 will be described. FIG. 8A is a view showing a state in which the probe 64 abuts against the placement plane 30 of the mounting table 14. FIG. 8B is a partially enlarged view of the vicinity of a contact point 78 in FIG. 8A.

As shown in FIGS. 8A and 8B, the sensor part 70 (diameter 2R) of the probe 64 abuts against the contact point 78 on the mounting table 14. The control device 28 moves the probe 64 in the Z-axis direction and detects XYZ-coordinates when the sensor part 70 comes into contact with the placement plane 30 of the mounting table 14.

FIG. 9 is a detailed flowchart relating to the acquiring step of the Z-axis relative position (Step S4 in FIG. 4). The sequence execution unit 50 starts moving the upper guide block 62 in the negative Z-direction (approaching direction) (Step S41) and determines whether abutment with the mounting table 14 has been detected (Step S42). If not yet detected (Step S42: NO), the control returns to Step S41, and the movement of the upper guide block 62 is continued as is.

When detecting abutment with the mounting table 14 (Step S42: YES), the sequence execution unit 50 stores the Z-coordinate of the position of the upper guide portion 60 (hereinafter referred to as "detected position") at which the signal from the probe 64 changes from "non-detection" to "detection" (Step S43).

Subsequently, the sequence execution unit 50 starts moving the upper guide block 62 in the positive Z-direction (departing direction) (Step S44) and determines whether the contact with the mounting table 14 is no longer detected (Step S45). If the contact is still detected (Step S45: NO), the control returns to Step S44, and the movement of the upper guide block 62 is continued as is.

On the other hand, when the sequence execution unit 50 no longer detects abutment with the mounting table 14 (Step S45: YES), the sequence execution unit 50 stores the Z-coordinate of the position of the upper guide portion 60 (hereinafter referred to as "non-detected position") at which the signal from the probe 64 changes from "detection" to "non-detection" (Step S46).

Subsequently, the sequence execution unit 50 determines whether or not the count of execution has reached a predetermined number (for example, N times) (Step S47). If the count has not reached yet (Step S47: NO), the control returns to Step S41, and then Steps S41 to S47 are repeated. On the other hand, if the predetermined number has been reached (Step S47: YES), the control proceeds to the next step (S48).

At Step S48, the sequence execution unit 50 performs statistical processing on the (2N) Z-coordinates stored at Steps S43 and S46, and calculates the Z-coordinate corresponding to the placement plane 30. For example, this may be calculated by dividing the sum of N Z-coordinates (at detection positions) and N Z-coordinates (at non-detection positions) by the number of samples (2N).

In this manner, the Z-coordinate of the upper guide portion 60 is calculated. Specifically, by subtracting the Z-coordinate of the mounting table 14 and the radius R of the sensor part 70 from the Z-coordinate of the upper guide portion 60, the Z-axis relative position from the upper guide portion 60 to the probe 64 can be calculated. When the radius R is sufficiently small, the influence of the size of the sensor part 70 may be ignored.

Calculation Example 2

As a second calculation example, a method of acquiring a Z-axis relative position from the upper guide portion 60 to the lower guide portion 66 will be described. This relative position is obtained by adding [1] the Z-axis relative position from the upper guide portion 60 to the mounting table 14 and [2] the Z-axis relative position from the mounting table 14 to the lower guide portion 66. Since the former value is equal to the Z-coordinate value of the machine coordinate system, it is known to the control device 28. The latter value is entered manually, for example, via the operation panel 48 (FIG. 1).

Calculation Example 3

As a third calculation example, a method of acquiring a Z-axis relative position from the lower guide portion 66 to the probe 64 will be described. Specifically, this can be calculated by subtracting [2] the Z-axis relative position from the upper guide portion 60 to the lower guide portion 66, from [1] the Z-axis relative position from the upper guide portion 60 to the probe 64.

In this way, the relative position acquisition unit 54 acquires the Z-axis relative positions between the upper guide portion 60, the lower guide portion 66, and the probe 64 (Step S4). It should be noted that the relative position acquisition unit 54 may acquire the Z-axis relative position after correcting the Z-coordinate based on the size of the sensor part 70 provided for the probe 64.

<Offset Correction Process (Step S5)>

At Step S5 in FIG. 4, the control device 28 (offset correction unit 55) corrects the offset measured at Step S1 using the information obtained from Steps S2 to S4. That is, the offset correction unit 55 obtains an offset corresponding to the inclined state of the workpiece W after changing the relative position between the upper guide portion 60 and the lower guide portion 66.

Calculation Example 1

In the first calculation example, the offset correction unit 55 calculates a correction amount of the offset from the relationship between the Z-axis relative position from the upper guide portion 60 to the probe 64 and the tilt angle θ of the workpiece W.

Figure 10:
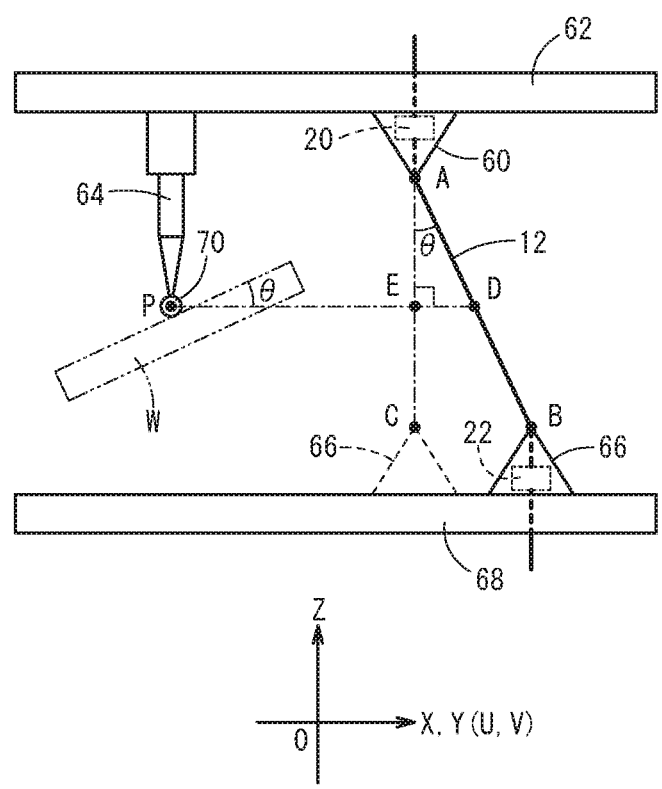
FIG. 10 is a schematic view for explaining a first calculation example by an offset correction unit.

FIG. 10 is a schematic view for explaining the first example of calculation by the offset correction unit 55. A point A indicates the position of the upper guide portion 60. A point B indicates the position of the lower guide portion 66 after movement. A point C indicates the position of the lower guide portion 66 before movement. A point D is a point of intersection between a line segment AB and a line that passes through the position (point P) of the probe 64 and is parallel to the XY-plane. A point E is a point of intersection between a line segment AC and a line that passes through a point P and is parallel to the XY-plane.

By simple geometrical considerations, a vector DE↑ is given by the following equation (3). Here, DE↑ is a vector indicating the offset correction amount, and t↑ is a unit vector in the DE direction parallel to the XY plane. Further, the magnitude of |AE| is calculated at Step S4 (Calculation Example 1).

$$DE\uparrow = |AE| \tan\theta \cdot t\uparrow \quad (3)$$

In this way, as the first calculation example, the offset correction unit 55 can correct the offset based on the tilt angle θ of the workpiece W as the tilt information and the Z-axis relative position acquired by the relative position acquisition unit 54.

Calculation Example 2

In the second calculation example, the offset correction unit 55 calculates a correction amount of the offset based on the amount of movement of the lower guide portion 66 and the relation of at least two Z-axis relative positions.

Figure 11:
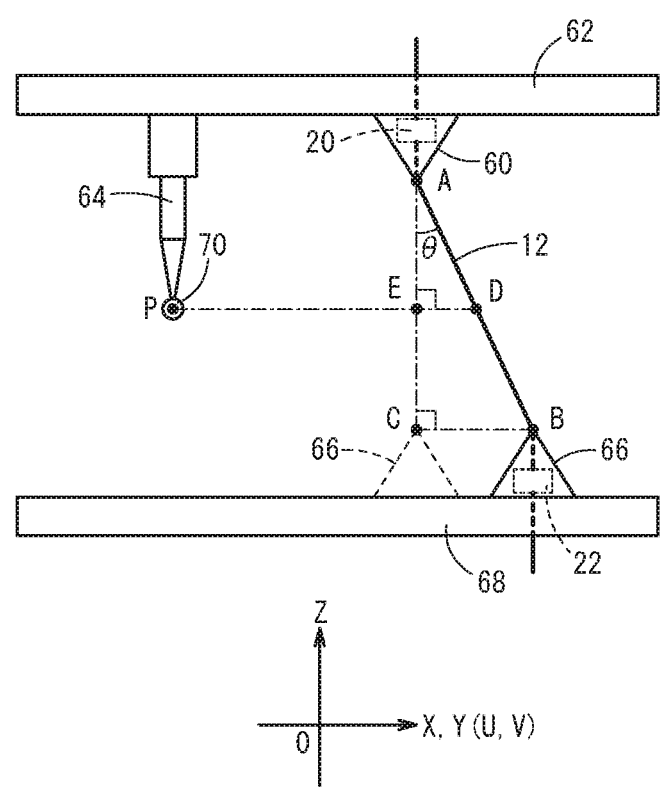
FIG. 11 is a schematic view for explaining a second calculation example by an offset correction unit.

FIG. 11 is a schematic diagram for explaining a second calculation example by the offset correction unit 55. The definitions of the points A to E are the same as those in FIG. 10 and will not be described.

By simple geometrical considerations, the vector DE↑ is given by the following equation (4). Here, BC↑ is an inverse vector of the movement of the lower guide portion 66. Further, the magnitude of |AE| is calculated at Step S4 (first calculation example), and the magnitude of |AC| is calculated at Step S4 (second calculation example).

$$DE\uparrow = |AE|/|AC| \cdot BC\uparrow \quad (4)$$

Alternatively, the vector DE↑ is expressed by the following equations (5) and (6) in place of Eq. (4). Here, the magnitude of |EC| is calculated at Step S4 (third calculation example).

$$DE\uparrow = |AE|/(|AE|+|EC|) \cdot BC\uparrow \quad (5)$$

$$DE\uparrow = (|AC|-|EC|)/|AC| \cdot BC\uparrow \quad (6)$$

In this way, as the second example, the offset correction unit 55 can correct the offset based on the amount of change (BC↑) in the position of the lower guide portion 66 as the tilt information and, at least, two Z-axis relative positions (AE↑, AC↑, EC↑) acquired by the relative position acquisition unit 54. Here, the offset correction unit 55 may correct the offset in accordance with the size of the sensor part 70 provided for the probe 64.

<Work Position Calculation Step (Step S6)>

At Step S6 in FIG. 4, the control device 28 (sequence execution unit 50) performs a series of sequence control for calculating the position of the workpiece W relative to each part. Specifically, the workpiece position calculating unit 56 calculates the position of the workpiece W using the offset corrected at Step S5.

Figure 12:
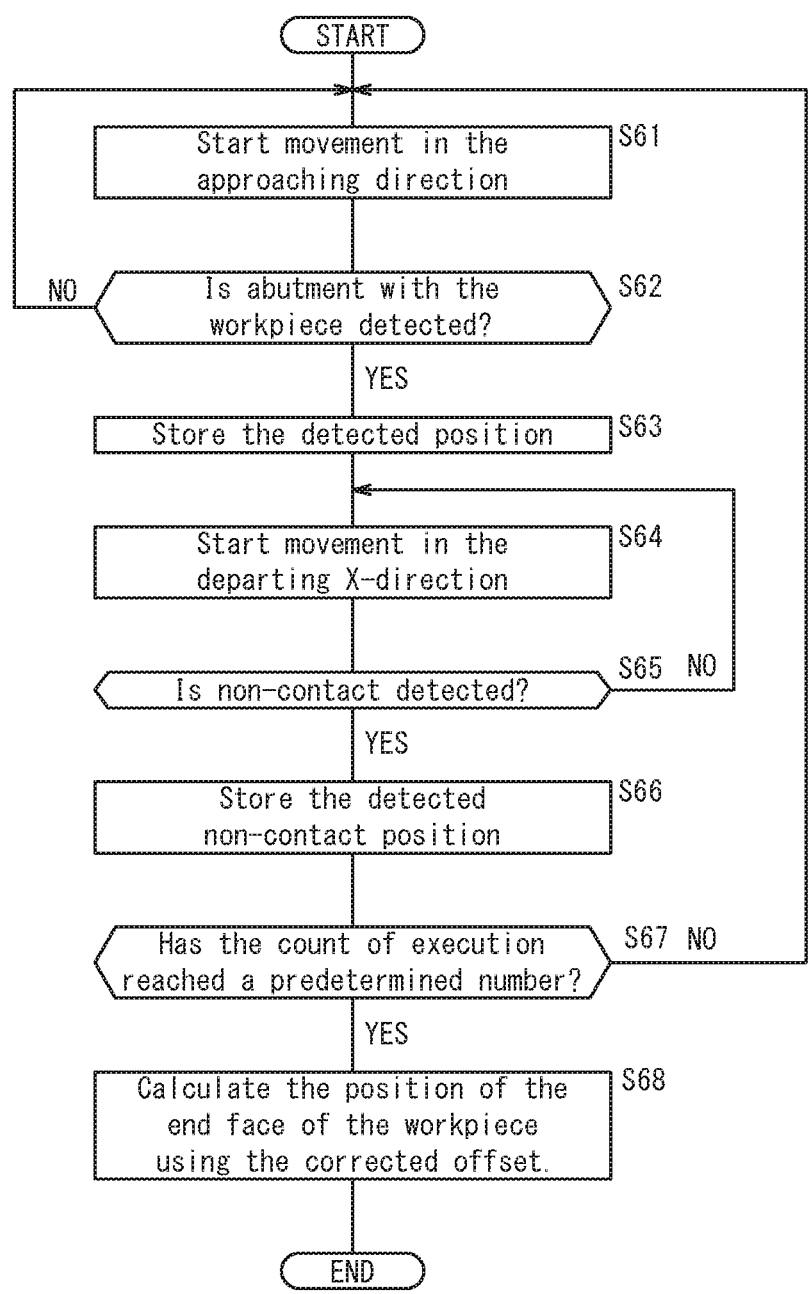
FIG. 12 is a flow chart for detailing a process (Step S6 in FIG. 4) of calculating the position of a workpiece; and, FIGS. 13A and 13B are schematic views showing the effect obtained by an offset correction function.

FIG. 12 is a detailed flowchart relating to the process of calculating the position of the workpiece W (Step S6 in FIG. 4). The sequence execution unit 50 starts moving the upper guide block 62 in the XY plane (in the approaching direction) (Step S61) and determines whether abutment with the workpiece W has been detected (Step S62). If not yet detected (Step S62: NO), the control returns to Step S61 and the movement of the upper guide block 62 is continued as it is.

On the other hand, when the sequence execution unit 50 detects abutment with the workpiece W (Step S62: YES), the sequence execution unit 50 stores the XY coordinates of the position of the upper guide portion 60 (hereinafter referred to as "detected position") at which the signal from the probe 64 changes from "non-detection" to "detection" (Step S63).

Subsequently, the sequence execution unit 50 starts the moving the upper guide block 62 in the XY plane (in the departing direction) (Step S64) and determines whether or not the abutment with the workpiece W is no longer detected (Step S65). If the abutment is still detected (Step S65: NO), the control returns to Step S64, and the movement of the upper guide block 62 is continued as it is.

On the other hand, when the sequence execution unit 50 no longer detects abutment with the workpiece W (Step S65: YES), the sequence execution unit 50 stores the XY-coordinates of the position of the upper guide portion 60 (hereinafter referred to as "non-detected position") at which the signal from the probe 64 changes from "detection" to "non-detection" (Step S66).

Subsequently, the sequence execution unit 50 determines whether or not the count of execution has reached a predetermined number (for example, N times) (Step S67). If the count has not reached yet (Step S67: NO), the control returns to Step S61, and then Steps S61 to S67 are repeated. On the other hand, if the predetermined number has been reached (Step S67: YES), the control proceeds to the next step (S68).

The workpiece position calculating unit 56 calculates the position of an end face S3 of the workpiece W using the corrected offset (Step S68). Prior to the calculation, the sequence execution unit 50 performs statistical processing on the (2N) XY-coordinates stored at steps S63 and S66, and calculates the XY-coordinates of the lower guide portion 66 when the end face S3 is detected. Thereafter, the workpiece position calculating unit 56 adds the X-axis offset value to the calculated X-coordinate, adds the Y-axis offset value to the calculated Y-coordinate, and calculates the position of the end face S3 in conformity with the inclined state of the workpiece W by considering the influence of the size of the sensor part 70. When the radius R is sufficiently small, the influence of the size of the sensor part 70 may be ignored.

<Execution Result of Horizontal Correction Function>

FIGS. 13A and 13B are schematic diagrams showing the effect obtained by the offset correction function. It is assumed that the offset values are ($\Delta x$, $\Delta y$) when the wire electrode 12 is stretched and extended in the Z-axis direction (FIG. 13A). It is also assumed that the offset errors when the wire electrode 12 is inclined by a tilt angle $\theta$ are (ex, ey). In this case, the corrected offset values are calculated as ($\Delta x+ex$, $\Delta y+ey$).

As a result, as shown in FIG. 13B, by simultaneously moving the upper guide portion 60 and the lower guide portion 66, it is possible to position the wire electrode 12 along the end face S3 of the workpiece W. In other words, by using both the "probe measurement function" and the "horizontal correction function", it is possible to maintain the processing accuracy while performing automatic detection of the workpiece position.

[Effect of Wire Electrical Discharge Machine 10]

As described above, the wire electrical discharge machine 10 is a machine tool that includes: [1] a mounting table 14 having a placement plane 30 on which a workpiece W can be placed; and [2] an upper guide portion 60 and lower guide portion 66 to support and stretch a wire electrode 12 therebetween, and [3] performs electrical discharge machining on the workpiece W under a condition where the relative position between the upper guide portion 60 and the lower guide portion 66 is adjusted so as to align the inclination of the wire electrode 12 with the tilt of the workpiece W with respect to the placement plane 30.

The wire electrical discharge machine 10 further includes: [4] a probe 64 configured to be movable integrally with the upper guide portion 60 and detect abutment against the workpiece W placed on the mounting table 14, [5] when a three-axis coordinate system is defined by an XY-plane coinciding with the placement plane 30 and a normal direction (Z-axis direction) of the placement plane 30, an offset storage 51 configured to store as an offset the relative position in the XY-plane between the upper guide portion 60 and the probe 64 that has detected position of abutment against the workpiece W before the relative position between the upper guide portion 60 and the lower guide portion 66 is changed; [6] a tilt information acquisition unit 52 configured to acquire tilt information representing a tilt state of the workpiece W with respect to the placement plane 30; and, [7] an offset correction unit 55 configured to correct the offset stored in the offset storage 51 based on the tilt information acquired by the tilt information acquisition unit 52 and thereby obtain an offset corresponding to the tilt state of the workpiece W after the relative position between the upper guide portion 60 and the lower guide portion 66 is changed.

The wire electrical discharge machining method using the wire electrical discharge machine 10 includes: [1] a storing step (Step S1 in FIG. 4) of storing as an offset the relative position in the XY-plane between the upper guide portion 60 and the probe 64 that has detected position of abutment against the workpiece W before the relative position between the upper guide portion 60 and the lower guide portion 66 is changed; and

[2] a tilt information acquiring step (Step S4 in FIG. 4) of acquiring tilt information representing a tilt state of the workpiece W with respect to the placement plane 30; and,

[3] a correcting step (Step S5 in FIG. 4) of correcting the stored offset based on the acquired tilt information and thereby obtaining an offset corresponding to the tilt state of the workpiece W after the relative position between the upper guide portion 60 and the lower guide portion 66 is changed.

In this way, by correcting the previously stored offset based on the tilt information indicating the tilt state of the workpiece W, it is possible to calculate offset values suitable for the tilt state of the workpiece W from a common offset. As a result, even when an inclination error of the workpiece W with respect to the placement plane 30 occurs, it is possible to maintain the processing accuracy and perform automatic detection of the workpiece position at the same time.

NOTES

It should be noted that the present invention is not limited to the above-described embodiment, but can be freely changed without departing from the gist of the present invention. Alternatively, each of configurations may be arbitrarily combined with others as long as no technical inconsistency occurs.

What is claimed is:

1. A wire electrical discharge machine, comprising:
a mounting table having a placement plane on which a workpiece is to be placed, wherein a three-axis coordinate system is defined by (i) an XY-plane coinciding with the placement plane and (ii) a normal direction of the placement plane;
a first guide portion and second guide portion configured to support and stretch a wire electrode therebetween, wherein the workpiece is subjected to electrical discharge machining under a condition where a relative position between the first guide portion and the second guide portion is changed so as to align an inclination of the wire electrode with a tilt of the workpiece relative to the placement plane;
a probe configured to be movable integrally with the first guide portion and detect abutment against the workpiece placed on the mounting table;
an offset storage configured to store, as an offset, a relative position in the XY-plane between the first guide portion and the probe that is in a detected position of abutment against the workpiece before the relative position between the first guide portion and the second guide portion is changed; and
a controller including a processor and a memory, the controller configured to
acquire tilt information representing a tilt state of the workpiece with respect to the placement plane, and
correct the offset stored in the offset storage based on the acquired tilt information to obtain an offset corresponding to the tilt state of the workpiece after the relative position between the first guide portion and the second guide portion is changed.

2. The wire electrical discharge machine according to claim 1, wherein
the controller is configured to
acquire a relative position in the normal direction between the probe and the first guide portion, and correct the stored offset based on (i) a tilt angle of the workpiece as the tilt information and on (ii) the acquired relative position in the normal direction between the probe and the first guide portion.

3. The wire electrical discharge machine according to claim 2, wherein
the controller is configured to acquire the relative position in the normal direction between the probe and the first guide portion by correcting a position of the first guide portion in the normal direction in accordance with a size of a sensor of the probe.

4. The wire electrical discharge machine according to claim 2, wherein
the controller is configured to correct the stored offset in accordance with a size of a sensor of the probe.

5. The wire electrical discharge machine according to claim 1, wherein
the controller is configured to
acquire at least two relative positions in the normal direction between the probe, the first guide portion, and the second guide portion, and
correct the stored offset based on (i) an amount of movement of a position of the second guide portion as the tilt information and (ii) the acquired at least two relative positions.

6. The wire electrical discharge machine according to claim 5, wherein
the controller is configured to acquire the relative position in the normal direction between the probe and the first guide portion by correcting a position of the first guide portion in the normal direction in accordance with a size of a sensor of the probe.

7. The wire electrical discharge machine according to claim 5, wherein
the controller is configured to correct the stored offset in accordance with a size of a sensor of the probe.

8. A wire electrical discharge machining method using a wire electrical discharge machine that includes:
a mounting table having a placement plane on which a workpiece is to be placed, wherein a three-axis coordinate system is defined by (i) an XY-plane coinciding with the placement plane and (ii) a normal direction of the placement plane;
a first guide portion and second guide portion that support and stretch a wire electrode therebetween, wherein the workpiece is subjected to electrical discharge machining under a condition where a relative position between the first guide portion and the second guide portion is changed so as to align an inclination of the wire electrode with a tilt of the workpiece with respect to the placement plane;
a probe configured to be movable integrally with the first guide portion and detect abutment against the workpiece placed on the mounting table; and
a controller,
the wire electrical discharge machining method comprising:

storing, in an offset storage, as an offset, a relative position in the XY-plane between the first guide portion and the probe that is in a detected position of abutment against the workpiece before the relative position between the first guide portion and the second guide portion is changed;
acquiring, by the controller, tilt information representing a tilt state of the workpiece with respect to the placement plane; and
correcting, by the controller, the stored offset based on the acquired tilt information to obtain an offset corresponding to the tilt state of the workpiece after the relative position between the first guide portion and the second guide portion is changed.

9. The wire electrical discharge machining method according to claim 8, further comprising:
acquiring, by the controller, a relative position in the normal direction between the probe and the first guide portion,
wherein, in the correcting, the stored offset is corrected based on (i) a tilt angle of the workpiece as the tilt information and (ii) the acquired relative position in the normal direction between the probe and the first guide portion.

10. The wire electrical discharge machining method according to claim 9, wherein
the relative position in the normal direction between the probe and the first guide portion is acquired by correcting, by the controller, the position of the first guide portion in the normal direction in accordance with a size of a sensor of the probe.

11. The wire electrical discharge machining method according to claim 9, wherein
in the correcting, the stored offset is corrected in accordance with a size of a sensor of the probe.

12. The wire electrical discharge machining method according to claim 8, further comprising:
acquiring, by the controller, at least two relative positions in the normal direction between the probe, the first guide portion, and the second guide portion,
wherein, in the correcting, the stored offset is corrected based on (i) an amount of movement of a position of the second guide portion as the tilt information and (ii) the acquired at least two relative positions.

13. The wire electrical discharge machining method according to claim 12, wherein
the relative position in the normal direction between the probe and the first guide portion is acquired by correcting, by the controller, the position of the first guide portion in the normal direction in accordance with a size of a sensor of the probe.

14. The wire electrical discharge machining method according to claim 12, wherein
in the correcting, the stored offset is corrected in accordance with a size of a sensor of the probe.

* * * * *